United States Patent Office 2,777,828
Patented Jan. 15, 1957

2,777,828

STABILIZATION OF MIXTURES OF UNSATURATED POLYESTERS AND COPOLYMERIZABLE MONOMERS BY MEANS OF HYDROXY SUBSTITUTED BENZOPHENONES

Harold M. Day and Victor E. Hasler, Noroton Heights, Conn., and Warren S. Forster, Somerville, N. J., assignors to American Cyanamid Company, New York, N. Y., a corporation of Maine No Drawing. Application April 3, 1953,
Serial No. 346,792

22 Claims. (Cl. 260—45.4)

This invention relates to polyester resinous materials and, more particularly, to unsaturated polyester resinous compositions containing a modifier, which prevents yellowing of said polyester resins in a cured condition on exposure to ultra-violet light. More particularly, this invention relates to a resinous composition comprising an unsaturated polyester in admixture with a polymerizable compound containing a $CH_2=C<$ group and a modifier therefor.

An object of the invention is to provide improved polyester resin compositions in which deterioration in the cured state resulting from exposure to ultraviolet radiation is minimized or eliminated.

Another object of the invention is to provide improved cured polyester resin compositions in which little or no yellowing occurs upon prolonged exposure to ultraviolet light.

A further and very important object of the present invention is to inhibit the color deterioration of the polyester compositions while experiencing no inhibiting effect on the gellation and cure rate of the resinous materials. These and other objects of the present invention will be discussed more fully hereinbelow.

Conventional polyester resins such as those prepared by reacting an alpha, beta unsaturated polycarboxylic acid with a dihydric aliphatic alcohol and said polyester being in admixture with a polymerizable compound containing a $CH_2=C<$ group are extremely useful as resinous compositions, particularly in the fields of molding, casting and laminating. If these polyester materials are used with dark pigments, such as maroon, black and the like, the effect of sunlight or, more particularly, ultra-violet light on said molded or cast articles is virtually insignificant. However, if these polyester resinous compositions are used without benefit of any coloring material where clear articles are desired and if said cast or molded articles are to be subjected to the sun's rays, they tend to show oftentimes marked yellowing which, of course, renders such an article less desirable because of this color deterioration. We have discovered that by incorporating into these conventional polyester resins, a small amount of a compound having the following general formula:

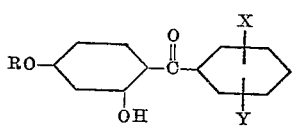

wherein R is an alkyl group having between 1 and 4 carbon atoms, X is an alkyl group containing between 1 and 4 carbon atoms or an alkoxy group containing between 1 and 4 carbon atoms, hydrogen or a halogen atom and wherein Y is an alkyl group containing between 1 and 4 carbon atoms or an alkoxy group containing between 1 and 4 carbon atoms or hydrogen or a halogen atom or a hydroxyl group, we are able to inhibit the tendency of the resinous material to yellow in a cured state when subjected to ultra-violet light and yet not inhibit gelation.

In the preparation of the unsaturated polyester resins of the present invention, one should make use of the alpha, beta unsaturated polycarboxylic acids such as maleic, fumaric, aconitic, itaconic, monochloro maleic anhydride and the like. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is, those which are free of non-benzenoid unsaturation, one could use such acids as phthalic, malonic, succinic, glutaric, sebacic and chlorinated polycarboxylic acids such as tetrachlorophthalic anhydride, hexachloroendomethylene tetrahydrophthalic acid and the like but in amounts less than a larger proportion of the total amount of polycarboxylic acid present. Whenever available the anhydrides of these acids may be used or mixtures of the acids or mixtures of the anhydrides thereof.

As polyhydric alcohols which may be used to prepare the unsaturated polyesters of the present invention, it is preferred to make use of those alcohols having only two hydroxy groups although minor amounts of alcohols having three hydroxy groups, four hydroxy groups or more hydroxy groups may be used in minor amounts. As dihydroxy alcohols, one could use ethylene glycol, diethylene glycol, propylene glycol, dipropylene glycol, butanediol 1–4, butanediol 1–3, butanediol 1–2, pentanediol 1–2, pentanediol 1–3, pentanediol 1–4, pentanediol 1–5, hexanediol 1–6 and the like. Additionally, one could use glycerol, pentaerythritol, dipentaerythritol and the like.

The modifier for the polyester resin is a polymerizable material having a $CH_2=C<$ group. Amongst these polymerizable compounds are styrene, side chain-substituted styrenes such as the alpha methylstyrene, alpha ethylstyrene and the like or ring-substituted styrenes such as ortho, meta and para-alkyl styrenes such as o-methylstyrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

In order that the present invention may be more completely understood, the following examples are set forth in which all parts are parts by weight. These examples are set forth primarily for the purpose of illustration and any specific enumeration of detail set forth therein should not be interpreted as limitations on the case except as indicated in the appended claims.

RESIN A

A polyester resin is prepared by coreacting 3 mols of phthalic anhydride, 3 mols of fumaric acid and 6.6 mols of propylene glycol. When esterification is substantially complete, as indicated by an acid number of about 30–40, there is added styrene in a sufficient amount to equal ½ of the polyester resin present and 0.02% by weight of ditertiary-butylhydroquinone based on the total weight of the unsaturated polyester and styrene, so that the ultimate composition contains 2 parts by weight of polyester resin per part by weight of monomeric styrene.

*Example 1*

To 200 parts of Resin A, there is added 2 parts of lauryl mercaptan as a 10% solution in styrene, 2 parts of methylethyl ketone peroxide catalyst and 0.25% by weight of 2-hydroxy-4-methoxybenzophenone. The sample was allowed to stand at 25° C. (room temperature) until gelation had occurred. The gelation occurred in less than 23 minutes. An identical sample subjected to heating at 40° C. gelled in 17 minutes. An identical sample was cast into a ⅛″ casting by curing the resinous composition for 18 hours at 125–250° F. Panels of these castings were subjected to ultraviolet light for 200 hours and observations were taken at the end of the 50th hour, the 100th hour and the 200th hour. The color of the casting exposed for 50 hours, 100 hours and 200 hours is water-white, which is substantially identical with the color of the casting prior to the ultraviolet light treatment. A similar casting when subjected to outdoor exposure showed no color deterioration even after six months exposure.

A similar casting, identical in all respects except that there is no 2-hydroxy-4-methoxybenzophenone present, when subjected to ultraviolet light treatment for 50 hours, developed a very marked yellowish coloration, as contrasted with the water-white appearance of the same casting prior to its subjection to the ultraviolet light treatment. Another similar casting, containing no ultraviolet light absorber, when subjected to outdoor exposure discolored badly after one month.

*Comparative Example 2*

To 200 parts of Resin A, there is added 2 parts of lauryl mercaptan as a 10% solution in styrene, 2 parts of methylethyl ketone peroxide and 0.25% by weight of 2,4-dihydroxybenzophenone. A sample of the resin left at room temperature did not gel in 120 minutes. Another sample of this same resin, when left at 40° C., gelled in 102 minutes.

*Example 3*

Two hundred (200) parts of Resin A, 2 parts of lauryl mercaptan as a 10% solution in styrene, 2 parts of methylethyl ketone peroxide and 0.25% by weight of 2-hydroxy-4-methoxy - 4′ - butylbenzophenone are mixed together. One portion of the mixture is permitted to stand at room temperature (25° C.) until gelation is observed. This sample took less than 23 minutes. A second sample of this resinous composition was warmed to 40° C. and gelation occurred in 14 minutes. Castings made from these resinous materials by the process indicated in Example 1 were exposed to ultraviolet light for 500 hours and observations were taken at the end of 50, 100, 200 and 500 hours to determine the effect of the ultraviolet light upon the casting. After 200 hours, no significant change had taken place in the color of the casting.

*Example 4*

The composition substantially identical with that set forth in Example 1 is duplicated except that in place of the 2-hydroxy-4-methoxybenzophenone, there is added 0.25% by weight of 2-hydroxy-4-methoxy-2′-chlorobenzophenone. One sample of this resinous composition, when held at room temperature (25° C.) gelled in less than 23 minutes, whereas a comparable sample, when held at 40° C., gelled in 14 minutes. Castings produced from this resinous material showed no deleterious effects after having been subjected to ultraviolet light for more than 200 hours.

*Example 5*

The resin composition according to Example 1 is duplicated, except that in the place of the 0.25% of the 2-hydroxy-4-methoxybenzophenone, there is substituted the 0.25% by weight of 2-hydroxy-4-methoxy-4′-chlorobenzophenone. One sample of this resinous composition, when left at room temperature (25° C.) gelled in less than 23 minutes, whereas a comparable sample, when held at 40° C. gelled in 15 minutes. Castings prepared from this resinous material, after exposure to ultraviolet light for more than 200 hours, showed no deleterious effect as a result of the ultraviolet light exposure.

*Example 6*

A resinous composition comparable to that set forth in Example 1 is prepared except that in place of the 0.25% by weight of the 2-hydroxy-4-methoxybenzophenone, there is substituted 2-hydroxy - 4,4′ - dimethoxybenzophenone. When a sample of this resin was left at room temperature (25° C.), it gelled in less than 23 minutes, whereas a comparable sample, when held at 40° C., gelled in 15 minutes. Castings made from this resinous composition showed no significant deterioration in color stabilization, even after exposure to ultraviolet light for more than 200 hours.

*Example 7*

A resinous composition substantially identical with that set forth in Example 1 is prepared, except that in place of the 0.25% by weight of the 2-hydroxy-4-methoxybenzophenone, there is substituted 0.25% by weight of 2-hydroxy-4-methoxy - 4′ - tertiary - butylbenzophenone, based on the total weight of the polyester resinous composition. The sample of this resin is permitted to stand at room temperature (25° C.) and gelation occurs in less than 23 minutes, whereas a comparable sample held at 40° C. gels in 14 minutes. Castings made from this resinous composition displayed excellent color stability, as indicated by no perceptible change in its water-white color, even after exposure to ultraviolet light for more than 200 hours.

*Example 8*

Example 1 is repeated except that in the place of the 2 parts of lauryl mercaptan as a 10% solution in styrene, there is added as a promoter 0.004% by weight of cobalt as cobalt naphthenate based on the total weight of polyester resin and styrene. When a sample of this composition was allowed to stand at 25° C., gelation occurred in approximately 64 minutes. An identical sample, when held at 40° C., gelled in 29 minutes.

*Comparative Example 9*

Comparative Example 2 is repeated except that in the place of the 2 parts of lauryl mercaptan as a 10% solution in styrene, there is added 0.004% by weight of cobalt as cobalt naphthenate based on total weight of polyester resin and styrene. A sample of this resin, held at room temperature, gelled in about 157 minutes. Another sample of this resin, when held at 40° C., gelled in 49 minutes.

*Example 10*

Example 1 is repeated except that in the place of 2 parts of lauryl mercaptan, there is used 0.6 part of lauryl mercaptan as a 10% solution in styrene. When a sample of this material is held at 25° C., it gelled in 44 minutes, whereas a sample held at 40° C. gelled in 21 minutes.

*Comparative Example 11*

Comparative Example 2 is repeated except that in the place of 2 parts of lauryl mercaptan, there is substituted 0.6 part of lauryl mercaptan as a 10% solution in styrene. When a sample of this composition was held at room temperature, it did not gel in 240 minutes, whereas a comparative sample when held at 40° C. gelled in 145 minutes.

Among the modifiers which may be employed in the present invention are 2,2′ - dihydroxy - 4,4′ - dimethoxybenzophenone, 2,2′-dihydroxy - 4,4′ - diethoxybenzophenone, 2,2′-dihydroxy - 4,4′-dipropoxybenzophenone, 2,2′- dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, 2,2'-dihydroxy-4-ethoxy-4'-propoxybenzophenone, 2,2'-dihydroxy-4-ethoxy-4'-butoxybenzophenone, 2,3'-dihydroxy-4,4'-dimethoxybenzophenone, 2,3'-dihydroxy-4-methoxy-4'-butoxybenzophenone, 2-hydroxy-4,4',5'-trimethoxybenzophenone, 2-hydroxy-4,4',6',-tributoxybenzophenone, 2-hydroxy-4-butoxy-4',5',-dimethoxybenzophenone, 2-hydroxy-4-ethoxy-2',4'-dibutylbenzophenone, 2-hydroxy-4-propoxy-4',6'-dichlorobenzophenone, 2-hydroxy-4-propoxy-4',6'-dibromobenzophenone. It will be appreciated that the halogen substituents in such compounds may be iodine or fluorine as well as the commoner chlorine and bromine atoms.

In order to illustrate the preparation of the substituted benzophenones used in the present invention, the following examples are set forth in which all parts are parts by weight. It should be remembered that these examples are set forth for the purpose of illustration only and any specific enumeration of detail set forth should not be interpreted as a limitation on the case except as indicated in the appended claims.

*Example 12*

To a cooled slurry of 110 parts of 1,3-dimethoxybenzene dispersed in 550 parts of chlorobenzene and 120 parts of 2,4-dimethoxy benzoyl chloride, there was added slowly 104 parts of aluminum chloride. The dark red slurry was then gradually heated to about 90° C. and held at this temperature until the reaction is substantially complete. The mixture is drowned in 2000 parts of ice and 167 parts of concentrated hydrochloric acid. The oily layer is separated and washed with 1026 parts of 5% hydrochloric acid. The solvent is removed by steam distillation and the residual oily substance solidified on standing. The solid product thus produced was reslurried in a 4.3% solution of sodium hydroxide. The slurried mixture was stirred and then heated until the desired product is substantially completed and extracted. The by-product was removed by filtration and the filtrate acidified. The lemon yellow product, namely 2,2'-dihydroxy-4,4'-dimethoxy-benzophenone, is isolated by filtration and washing. If it is desired, the product may be recrystallized from organic solvents to yield a substantially pure product. When this is accomplished the pure product melts at about 133–135° C.

*Example 13*

Example 12 is repeated except that in the place of 1,3-dimethoxybenzene, there is substituted an equivalent amount of 1,3-diethoxybenzene. The compound produced is 2,2'-dihydroxy-4-methoxy-4'-ethoxybenzophenone.

*Example 14*

Example 12 is repeated except that in the place of 1,3-dimethoxybenzene, there is substituted an equivalent amount of 1,3-dibutoxybenzene and the resulting compound is 2,2'-dihydroxy-4-methoxy-4'-butoxybenzophenone.

*Example 15*

Example 12 is repeated except that in the place of 1,3-dimethoxybenzene, there is substituted an equivalent amount of 1-methoxy-3-chlorobenzene and the resulting compound is 2,2'-dihydroxy-4-methoxy-4'-chlorobenzophenone.

*Example 16*

A solution of 21.2 parts of benzoyl chloride, 40 parts of 1,3-di-n-butoxybenzene and 139 parts of monochlorobenzene is cooled in an ice bath while adding gradually 26 parts of anhydrous aluminum chloride. The red slurry is then heated to 90° C. and held at that temperature until the reaction is substantially complete. The color became red-brown and the mixture was not homogeneous. When it has cooled, the reaction mixture is poured onto a mixture of 750 parts of ice and 45 parts of concentrated hydrochloric acid. The mixture is stirred and the oil layer is separated. The latter is then washed with dilute hydrochloric acid and the monochlorobenzene is steamed out. The residue is extracted with dilute sodium bicarbonate solution before being finally dissolved in hot dilute caustic and clarified by filtration. The filtrate, on acidification with concentrated hydrochloric acid, precipitated the product. The crude material was recrystallized from 95% alcohol to give pure 2-hydroxy-4-butoxybenzophenone.

*Example 17*

A solution of 320 parts of tetrachloroethane, 49 parts of 1,3-dimethoxybenzene, and 43.7 parts of p-tertiary-butyl-benzoyl chloride (prepared from 132.6 parts of p-tertiary-butylbenzoic acid and 106 parts of thionylchloride) is cooled in an ice bath while 38.8 parts of anhydrous aluminum chloride are added gradually. The deep green reaction mixture becomes deep red as it is heated to 90° C. It is held at that temperature until the reaction is substantially complete. While the reaction mixture is being cooled with an ice bath, 500 parts of 6N hydrochloric acid are added. The oil layer is then separated and washed successively with dilute hydrochloric acid, water, dilute aqueous ammonia, and, finally, with water until the washings are neutral. The tetrachloroethane is removed by steaming. The residual oil, on standing, forms a solid. The latter is ground and slurried in 1 liter of 2.5% sodium bicarbonate solution, filtered, washed and dried after recrystallization from 95% ethanol. The pale yellow solid melts at 75–77° C. and gives a correct analysis for 2-hydroxy-4-methoxy-4'-tertiary-butylbenzophenone.

*Example 18*

A solution of 87.5 parts of para-chlorobenzoyl chloride, 640 parts of tetrachloroethane, and 97.3 parts of 1,3-dimethoxybenzene is cooled with an ice batch while 77.6 parts of aluminum chloride (anhydrous) are added gradually. The mixture is stirred at room temperature four hours and allowed to stand overnight. The temperature is then slowly raised to 90° C., at which temperature it is held until the reaction is substantially complete. The purple solution is cooled and 500 parts of 6N hydrochloric acid are added slowly. The mixture is stirred and heated a short time at 50° C. to break up the lumps. When it has cooled, the oil layer is separated, washed with dilute hydrochloric acid, water, a dilute aqueous solution of ammonia, and finally until neutral with water. The tetrachloroethane is steamed out. The residual yellow solid is filtered from the water present and slurried twice in 1 liter of 2.5% sodium bicarbonate solution, filtering off the solid each time. The solid is finally dissolved in hot dilute caustic soda, filtered hot, and the filtrate acidified with concentrated hydrochloric acid. The precipitated product is filtered, washed, dried, and recrystallized from 95% ethanol to obtain a very pale yellow product melting at 109–112° C. and giving a correct analysis for 2-hydroxy-4-methoxy-4'-chlorobenzophenone.

*Example 19*

A solution of 98 parts of ortho-chlorobenzoyl chloride, 900 parts of tetrachloroethane, and 139 parts of 1,3-dimethoxy-benzene was cooled in an ice bath while 140 parts of anhydrous aluminum chloride are added gradually with stirring. The mixture is slowly brought to 90° C. and held at that temperature until the reaction is substantially complete. The mixture is allowed to cool while 500 parts of 6N hydrochloric acid are added. The oil layer is separated from the water and the oil is washed with dilute hydrochloric acid, water, dilute aqueous ammonia, and finally with water until neutral. The tetrachloroethane is steamed out and the residue is allowed to stand in ice to crystallize. The solid product is ground to a powder and slurried twice in one liter of 3.5% NaHCO3 solution, filtering each time. The dried solid is finally dissolved in dilute caustic, filtered, and the filtrate is acidified with concentrated hydrochloric acid. The white solid which is thus isolated melts at 85–88° C. and gives a correct analysis for 2-hydroxy-4-methoxy-2'-chlorobenzophenone.

Among other light-stabilizing agents according to the present invention which may be added to the polymerizable polyester resinous compositions are 2-hydroxy-4-methoxybenzophenone, 2-hydroxy-4-ethoxy-benzophenone, 2-hydroxy-4-propoxybenzophenone, 2-hydroxy-4-butoxybenzophenone, 2-hydroxy-4-methoxy-4'-methylbenzophenone, 2-hydroxy-4-methoxy-4'-ethylbenzophenone, 2-hydroxy-4-methoxy-4'-propylbenzophenone, 2-hydroxy-4-methoxy-4'-butylbenzophenone, 2-hydroxy-4-methoxy-4'-chlorobenzophenone, 2-hydroxy-4-methoxy-4'-bromobenzophenone, 2-hydroxy-4,4'-dimethoxybenzophenone, 2-hydroxy-4,4'-dimethoxy-3-methylbenzophenone, 2-hydroxy-4,4'-dimethoxy-2'-ethylbenzophenone, 2-hydroxy-4,4',5'-trimethoxybenzophenone, 2-hydroxy-4-ethoxy-4'-methylbenzophenone, 2-hydroxy-4-ethoxy-4'-ethylbenzophenone, 2-hydroxy-4-ethoxy-4'-propylbenzophenone, 2-hydroxy-4-ethoxy-4'-butylbenzophenone, 2-hydroxy-4-ethoxy-4'-methoxybenzophenone, 2-hydroxy-4,4'-diethoxybenzophenone, 2-hydroxy-4-ethoxy-4'-propoxybenzophenone, 2-hydroxy-4-ethoxy-4'-butoxybenzophenone, 2-hydroxy-4-ethoxy-4'-chlorobenzophenone, 2-hydroxy-4-ethoxy-4'-bromobenzophenone, and the like. From this illustration of representative compounds, it is apparent that the 2', 3', 4', 5' and 6' positions in the above structural formula may be unsubstituted, or there may be either one or two substituents from selected categories. One suitable substituent may be a methyl, ethyl, propyl, butyl, methoxy, ethoxy, propoxy, butoxy or hydroxy radical or a chlorine, bromine, iodine or fluorine atom. An optional second substituent on the ring may be any of those named except the hydroxyl radical. The amount of the ultraviolet light-absorbing material which may be used in accordance with the present invention may vary between about 0.01–5% by weight based on the total weight of the polyester resin solids and the weight of the compound containing the CH2=C<group. Preferably, however, one could use from about 0.1–1.0% by weight of these compounds, based on the total weight of the unsaturated polyester resinous composition solids.

In the preparation of the unsaturated polyester, used in the present invention, one could use the polyhydric alcohols and polycarboxylic acids in a proportion substantially equalling about mol per mol and preferably an excess of alcohol approximating 10% above the stoichiometrical quantity required for complete esterification. When polyhydric alcohols having more than 2 hydroxy groups are used, calculations should be made on a stoichiometrical basis so as to make allowance for the additional hydroxy groups, such as those found in glycerol, pentaerythritol, dipentaerythritol and the like. This is equally true when polycarboxylic acids having greater than 2 carboxyl groups are used. The important thing to remember is that on a stoichiometrical basis, a sufficient quantity of the alcohol and acid should be reacted so as to give an ultimate unsaturated polyester resinous material having an acid number not significantly greater than 100 and preferably not significantly greater than 50. For optimum results, the polyester resinous materials should be reacted in adequate quantities of alcohol and acids so as to give a polyester resin having an acid number not significantly greater than 30–40.

In the preparation of the polymerizable polyester compositions of the present invention, one could use between about 20 parts by weight of the monomeric compound containing the polymerizable CH2=C<group to 80 parts of the unsaturated polyester resin up to 80 parts of the monomer compound containing a polymerizable CH2=C<group to 20 parts of the unsaturated polyester resin. As a preferred embodiment, however, it is desired to use about 33 parts of the monomeric polymerizable compound containing the CH2=C<group to each 67 parts of the unsaturated polyester resinous material.

The compositions containing the unsaturated polyester resin and the compound containing the polymerizable CH2=C<group are disclosed in a plurality of U. S. patents, such as 2,443,735–41, inclusive, amongst others.

In the formulation of the resinous composition of the present invention, it is imperative that a catalyst be present and it is preferably a catalyst of the peroxide class of which a great plurality are set forth in those U. S. patents mentioned hereinabove. The amount of catalyst may vary very appreciably, from about 0.1–10% by weight based on the total weight of the polymerizable composition. Preferably, one would use between about 0.5 and about 1% by weight of these catalysts, based on the total weight of the polymerizable resinous composition.

If it is desired to effect low temperature cure of the unsaturated polyester resinous composition, it will be desirable to make use of a material commonly referred to as a promoter. These promoters, such as the mercaptans, the alkyl substituted anilines and the metallic salt driers, e. g., cobalt naphthenate, are generally dispersed in a solution of a suitable solvent material, such as the monomeric polymerizable material. If high temperature cure is to be accomplished, a promoter is not necessary. Promoters which are useful in this connection have been disclosed in prior art as represented by such patents as U. S. 2,466,800 and 2,480,928.

We claim:

1. A light-stable resinous composition comprising a copolymerizable mixture of (1) between about 20 and 80 parts by weight of an unsaturated polyester resin, (2) between about 20 and about 80 parts of a monomeric compound containing a polymerizable CH2=C< group, (3) a polymerization catalyst for (1) and (2), and (4) 0.01%–5%, based on the total weight of (1) and (2), of a compound having the general formula:

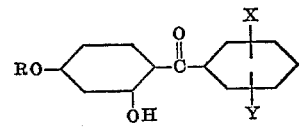

wherein R is an alkyl group having between 1 and 4 carbon atoms, X is a member selected from the group consisting of alkyl groups having between 1 and 4 carbon atoms, alkoxy groups having between 1 and 4 carbon atoms, halogen atoms and hydrogen and Y is a member selected from the group consisting of alkyl groups having between 1 and 4 carbon atoms, alkoxy groups having between 1 and 4 carbon atoms, halogen atoms, a hydroxyl group and hydrogen.

2. A light-stable, resinous composition comprising a copolymerizable mixture of (1) between about 20 and about 80 parts by weight of an unsaturated polyester resin, (2) between about 20 and about 80 parts of a monomeric compound containing a polymerizable CH2=C< group, (3) a polymerization catalyst for (1) and (2), and (4) 0.01%–5%, based on the total weight of (1) and (2), of 2-hydroxy, 4-methoxybenzophenone.

3. A light-stable resinous composition comprising a copolymerizable mixture of (1) between about 20 and about 80 parts by weight of an unsaturated polyester resin, (2) between about 20 and about 80 parts of a monomeric compound containing a polymerizable CH2=C< group, (3) a polymerization catalyst for (1) and (2), and (4) 0.01%–5%, based on the total weight of (1) and (2), of 2-hydroxy, 4-ethoxybenzophenone.

4. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2), (4) 0.01%–5%, based on the total weight of (1) and (2), of 4,4'-dimethoxy, 2-hydroxybenzophenone.

5. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2), and (4) 0.01%–5%, based on the total weight of (1) and (2), of 4,4'-diethoxy-2-hydroxybenzophenone.

6. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2) and (4) 0.01%–5%, based of the total weight of (1) and (2), of 4-methoxy, 4'-ethoxy-2-hydroxybenzophenone.

7. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2), and (4) 0.1%–1.0%, based on the total weight of (1) and (2), of a compound having the general formula:

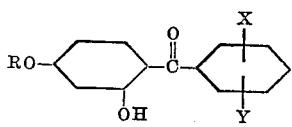

wherein R is an alkyl group having between 1 and 4 carbon atoms, X is a member selected from the group consisting of alkyl groups having between 1 and 4 carbon atoms, alkoxy groups having between 1 and 4 carbon atoms, halogen atoms and hydrogen and Y is a member selected from the group consisting of alkyl groups having between 1 and 4 carbon atoms, alkoxy groups having between 1 and 4 carbon atoms, halogen atoms, a hydroxyl group and hydrogen.

8. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2), and (4) 0.1%–1.0%, based on the total weight of (1) and (2), of 2-hydroxy-4-methoxybenzophenone.

9. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2), and (4) 0.1%–1.0%, based on the total weight of (1) and (2), of 2-hydroxy-4-ethoxybenzophenone.

10. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2), and (4) 0.1%–1.0%, based on the total weight of (1) and (2), of 4,4'-dimethoxy-2-hydroxybenzophenone.

11. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2), and (4) 0.1%–1.0%, based on the total weight of (1) and (2), of 4,4'-diethoxy-2-hydroxybenzophenone.

12. A light-stable resinous composition comprising a copolymerizable mixture of (1) between about 20 and about 80 parts by weight of an unsaturated polyester resin, (2) between about 20 and about 80 parts of a monomeric compound containing a polymerizable CH₂=C< group, (3) a polymerization catalyst for (1) and (2), and (4) 0.1%–1.0%, based on the total weight of (1) and (2), of 4-methoxy-4'-ethoxy-2-hydroxybenzophenone.

13. A light-stable resinous composition comprising a copolymerizable mixture of (1) between about 20 and about 80 parts by weight of an unsaturated polyester resin, (2) between about 20 and about 80 parts of styrene, (3) a polymerization catalyst for (1) and (2), and (4) 0.1%–1.0%, based on the total weight of (1) and (2), of a compound having the general formula:

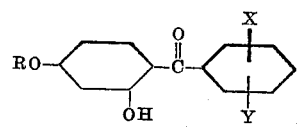

wherein R is an alkyl group having between 1 and 4 carbon atoms, X is a member selected from the group consisting of alkyl groups having between 1 and 4 carbon atoms, alkoxy groups having between 1 and 4 carbon atoms, halogen atoms and hydrogen and Y is a member selected from the group consisting of alkyl groups having between 1 and 4 carbon atoms, alkoxy groups having between 1 and 4 carbon atoms, halogen atoms, a hydroxyl group and hydrogen.

14. A light-stable resinous composition comprising a copolymerizable mixture of (1) between about 20 and about 80 parts by weight of an unsaturated polyester resin, (2) between about 20 and about 80 parts of styrene, (3) a polymerization catalyst for (1) and (2), and (4) 0.1%–1.0%, based on the total weight of (1) and (2), of 2-hydroxy-2-methoxybenzophenone.

15. A light-stable resinous composition comprising a copolymerizable mixture of (1) between about 20 and about 80 parts by weight of an unsaturated polyester resin, (2) between about 20 and about 80 parts of styrene, (3) a polymerization catalyst for (1) and (2) and (4) 0.1%–1.0%, based on the total weight of (1) (2), of 2-hydroxy-4-ethoxybenzophenone.

16. A light-stable resinous composition comprising a copolymerizable mixture of (1) between about 20 and about 80 parts by weight of an unsaturated polyester resin, (2) between about 20 and about 80 parts of styrene, (3) a polymerization catalyst for (1) and (2), and (4) 0.1%–1.0%, based on the total weight of (1) and (2), of 4,4'-dimethoxy-2-hydroxybenzophenone.

17. A light-stable resinous composition comprising a copolymerizable mixture of (1) between about 20 and about 80 parts by weight of an unsaturated polyester resin, (2) between about 20 and about 80 parts of styrene, (3) a polymerization catalyst for (1) and (2), and (4) 0.1%–1.0%, based on the total weight of (1) and (2), of 4,4'-diethoxy-2-hydroxybenzophenone.

18. A light-stable resinous composition comprising a copolymerizable mixture of (1) between about 20 and about 80 parts by weight of an unsaturated polyester resin, (2) between about 20 and about 80 parts of styrene, (3) a polymerization catalyst for (1) and (2), and (4) 0.1%–1.0%, based on the total weight of (1) and (2), of 4-methoxy-4'-ethoxy-2-hydroxybenzophenone.

19. A process which comprises copolymerizing a composition according to claim 1 to produce a light-stable, substantially infusible, substantially insoluble resin.

20. A process which comprises copolymerizing a composition according to claim 14 to produce a light-stable, substantially infusible, substantially insoluble resin.

21. A light-stable, substantially infusible, substantially insoluble resin obtained by copolymerizing a composition according to claim 1.

22. A light-stable, substantially infusible, substantially insoluble resin obtained by copolymerizing a composition according to claim 14.

References Cited in the file of this patent

UNITED STATES PATENTS

| | | |
|---|---|---|
| 2,407,479 | D'Alelio | Sept. 10, 1946 |
| 2,419,553 | Houtman | Apr. 29, 1947 |
| 2,528,789 | Sachanen et al. | Nov. 7, 1950 |
| 2,538,355 | Davis et al. | Jan. 16, 1951 |
| 2,560,028 | Kitchen et al. | July 10, 1951 |
| 2,693,492 | Hoch | Nov. 2, 1954 |

OTHER REFERENCES

Freedlander: article in Proceedings of the Society of Experimental Biology and Medicine, Oct.–Dec., 1942, vol. 51, pages 153–156.